(12) United States Patent
Shanker

(10) Patent No.: US 8,714,190 B2
(45) Date of Patent: May 6, 2014

(54) METAL PLATE FOR DUAL PLATE CHECK VALVE

(75) Inventor: Uma Shanker, Noida (IN)

(73) Assignee: Advance Valves PVT. Ltd., New Delhi (IN)

( * ) Notice: Subject to any disclaimer, the term of this patent is extended or adjusted under 35 U.S.C. 154(b) by 52 days.

(21) Appl. No.: 13/148,225

(22) PCT Filed: Feb. 8, 2010

(86) PCT No.: PCT/IN2010/000068
§ 371 (c)(1),
(2), (4) Date: Oct. 21, 2011

(87) PCT Pub. No.: WO2010/089779
PCT Pub. Date: Aug. 12, 2010

(65) Prior Publication Data
US 2012/0042968 A1    Feb. 23, 2012

(30) Foreign Application Priority Data
Feb. 6, 2009   (IN) .............................. 237/DEL/2009

(51) Int. Cl.
*F16K 15/00*    (2006.01)

(52) U.S. Cl.
USPC ........................................ 137/512.1; 137/527

(58) Field of Classification Search
USPC ........................... 137/512, 512.1, 512.15, 527
See application file for complete search history.

(56) References Cited

U.S. PATENT DOCUMENTS

| 4,445,533 A * | 5/1984 | DeFrees ..................... 137/512.1 |
| 5,392,810 A * | 2/1995 | Cooper et al. ............. 137/512.1 |
| 5,711,343 A | 1/1998 | Beckett |
| 7,493,770 B2 * | 2/2009 | Christianson et al. .......... 60/785 |
| 2008/0053536 A1 | 3/2008 | Denike et al. |

FOREIGN PATENT DOCUMENTS

EP           0611907         8/1994

* cited by examiner

*Primary Examiner* — Kevin Lee
*Assistant Examiner* — Macade Brown
(74) *Attorney, Agent, or Firm* — K&L Gates LLP

(57) ABSTRACT

A metal plate for a dual plate check valve includes a substantially circular segment shaped plate member of a predetermined substantially uniform thickness and is pivotally mounted to enable rotation about an axis substantially parallel and adjacent to a chord. The plate member has a central portion and two extreme end portions distal to the central portion. The end portions are provided with reinforcements thereby increasing the thickness of the plate member in the end portions, the reinforcements being located so that when the plate member of the check valve is in a closed position, the end portions with reinforcements are in a radially outward direction from the valve seat of the check valve. When back pressure acts on the plate member, the reinforcements enable the plate member to distort substantially uniformly to maintain sealing contact with the valve seat.

13 Claims, 5 Drawing Sheets

METAL PLATE FOR DUAL PLATE CHECK VALVE

FIELD OF INVENTION

This invention relates to a metal plate for dual plate check valves.

Dual plate wafer check valves generally comprise an annular housing with two substantially semi-circular, or D-shaped valve members or plates pivotally mounted on a diametrical hinge pin. These plates can take up a valve closed position in which they shut respective semi-circular or D shaped apertures defined in the housing by a diametrical cross piece. The plates are generally operated by spring-urged towards the closed position. They can be urged, by pressure of a given level on the upstream side of the valve, towards an open position in which they lie generally parallel to the housing axis. The metal plates may be provided with a shock bumper in the central portion and form of a lug projecting from the semi-circular edge on the side of the plate which does not contact the valve seat surrounding the semi-circular openings. Generally there is also a stop pin provided parallel to the hinge pin which prevents either flap from pivoting more than 90 degree from the valve closed position.

Wafer check valves are non-return valves which open in response to pressure of a given level on the upstream side, that is to say pressure applied to the plates via the semi-circular openings. As pressure decreases and the flow rate drops, the plates are urged by reverse pressure, in some cases with the assistance of spring means, towards the valve closed position.

Generally the plates of the check valves or non return valves for high pressure applications, i.e. those of ANSI Class 150 pressure rating (PN 20) and above, are cast or forged metal plates. A limitation of the use of known dual plate wafer check valves reliant on a metal-to-metal seal is their performance with regard to reverse flow leakage compared with other check valves. An unfavorable reverse leakage performance characteristic of such check valves have been known to be a feature of the two D shaped seats on the body and the two independent D shaped plates pivoting around a hinge pin.

The performance on reverse flow leakage is due to reverse pressure on the D shaped valve plate. Specifically the reverse pressure may be considered as giving rise to a force which resultantly operates on the center of pressure which is on the center line of the D approximately one third of the way from the diameter. This causes the D shaped valve members to bow or flex. This, flexing is not uniform, but is greatest at the corners or ears of the D shape of the valve plate and it is at this point that leakage is first seen.

In an effort to minimize leakage in higher pressure fluid systems with increasing back pressure, the known wafer check valves use increasing plate thickness and increasing rigidity, and so thickness, of the seat area, for example by increasing the cross section area of the diametrical bar and the circumferential seating area. The intention is to provide maximum rigidity against distortion by the back pressure in an attempt to maintain as much contact as possible between the plate and the seat area, particularly at the "ear" area. This means using an increased amount of material for the valve plates for high pressure use. This adds to the cost. Further, the use of thicker plates decreases the flow area and increases pressure drop across the valve. The heavier weight of the sealing plates, which may be substantial on larger sized valves in the high pressure ranges, also gives rise to increased friction and wear on the hinges of the plates, reducing the performance of the valve and increasing closing response time. This reduction in performance increases the likelihood of the plates slamming shut causing increased wear, noise and potential damage to other line equipment.

PRIOR ART

There is a preexisting problem of reverse flow leakage in the dual plate wafer check valve, more particularly, in the check valves for cryogenic and high temperature use.

U.S. Pat. No. 5,392,810 teaches a metal plate for a dual plate check valve. Central portion of the D shaped plate is reinforced such as by means of a raised area on either or both sides of the plate to resist deformation when subjected to reverse pressure in the valve closed position, while the D shaped edge portion of the plate is made sufficiently flexible to maintain or improve sealing engagement with a valve seat even when the valve seat is distorted by the effect of reverse pressure in the valve closed position.

Drawback in the Prior Art and Solution Therto

The problem with the known arrangement of D shaped plate member is that the reinforcement increases the thickness on one or both side of the plate in the central portion causing turbulence in the fluid flowing through the valve bore. The turbulence can cause rotation of the pins. This increases the rate of wear and corrosion of the valve body adjacent to the pin, especially where the valve bodies are made from cast iron. Failure can occur because of the hole enlargement owing to this rotation.

It has been surprisingly found that when the reinforced portions on valve plate are shifted to extreme end portions or ear area of the plate member, the valve plate distort sufficiently uniform to provide a better sealing contact with the valve seat.

The present invention over comes all the problems in the prior art by providing fairly uniform thickness of the metal plate and providing the reinforcement in the extreme end portions or ears of the plate member.

OBJECT OF THE INVENTION

The principal object of the invention is to provide a metal plate for dual plate check valve which restrict the reverse flow leakage.

The other object of the invention is to provide a metal plate for dual plate check valve with reduced turbulence in the flow of fluid.

These and other objects and advantages of the invention will be clear from the ensuing description.

BRIEF DESCRIPTION OF INVENTION

A metal plate for a dual plate check valve is a substantially circular segment shaped plate member of a predetermined substantially uniform thickness except at the end portion. A means is provided for pivotally mounting said plate member to enable free rotation about an axis substantially parallel and adjacent to chord of said circular segment of the plate member. Said plate member is having a central portion and two extreme end portions distal to said central portion. Said end portions of the plate member are provided with reinforcements. The reinforcements are in the form of increasing the thickness of the plate member in the end portions. This increasing of the thickness may be of any shape such as one or more ribs or dome shape. The reinforcements may be provided on both sides of the plate member or on one side opposite to the side of the plate member which is sitting on valve seat. The reinforcements are so located that when the plate member of the check valve is in closed position, the end portions with reinforcements are in radially outward direction from the valve seat of the check valve. When back pressure acts on said plate member, said reinforcements enable said plate member to distort substantially uniformly to maintain sealing contact with the valve seat.

The metal plate for a dual plate check valve may be of a cast, forged or rolled metal plate.

The reinforcements provided on the metal plate for a dual plate check valve may have suitable height so as to work as stopper in cooperation with a stopper pin.

In the dual plate check valve, the means for pivotally mounting said plate member may be at least one hinge eye fixed proximal to the chord of the circular segment shaped plate member. The at least one hinge pin is configured to receive a hinge pin (8) adapted to be rotatably fitted therein. In an embodiment of the present invention, the plate member may have two eyes fixed proximal to the chord and the extreme end portions of the circular segment shaped plate member.

The metal plate is for a dual plate check valve. The dual plate check valve comprises an annular valve body. The body has an upstream end and a downstream end and a through passage with two substantially circular segment shaped openings. Two substantially circular segment shaped metal plate member close, effectively, said openings by properly sitting on the valve seat. Said plate member is of predetermined substantially uniform thickness. The plate member may be hinged on at least one hinge pin and loaded with a spring. The plate member is prevented from toppling over by a stop pin. The plate member has a central portion and two extreme end portions distal to said central portion. The end portions are provided with reinforcements, which is in the form of increasing the thickness of the plate member in the end portions. The reinforcements may be so located that when the plate member of the check valve is in closed position, the end portions with reinforcements are in radially outward direction from the valve sheet of the check valve. When back pressure acts on said plate member, said reinforcements enable said plate member to distort substantially uniformly to maintain sealing contact with the valve seat.

STATEMENT OF INVENTION

According to the present invention, there is provided a metal plate for a dual plate check valve comprising a substantially circular segment shaped plate member of a predetermined substantially uniform thickness and a means for pivotally mounting said plate member to enable rotation about an axis substantially parallel and adjacent to chord of said circular segment of the plate member, said plate member having a central portion and two extreme end portions distal to said central portion, characterized in that: said end portions are provided with reinforcements, thereby increasing the thickness of the plate member in the end portions, the reinforcements being so located that when the plate member of the check valve is in closed position, the end portions with reinforcements are in radially outward direction from the valve seat of the check valve, when back pressure acts on said plate member, said reinforcements enable said plate member to distort substantially uniformly to maintain sealing contact with the valve seat.

In accordance with invention non limiting embodiments of the invention are described hereafter with reference to the accompanying drawings.

BRIEF DESCRIPTION OF ACCOMPANIED DRAWINGS

DETAIL DESCRIPTION OF INVENTION WITH REFERENCE TO DRAWINGS

Figure 1:
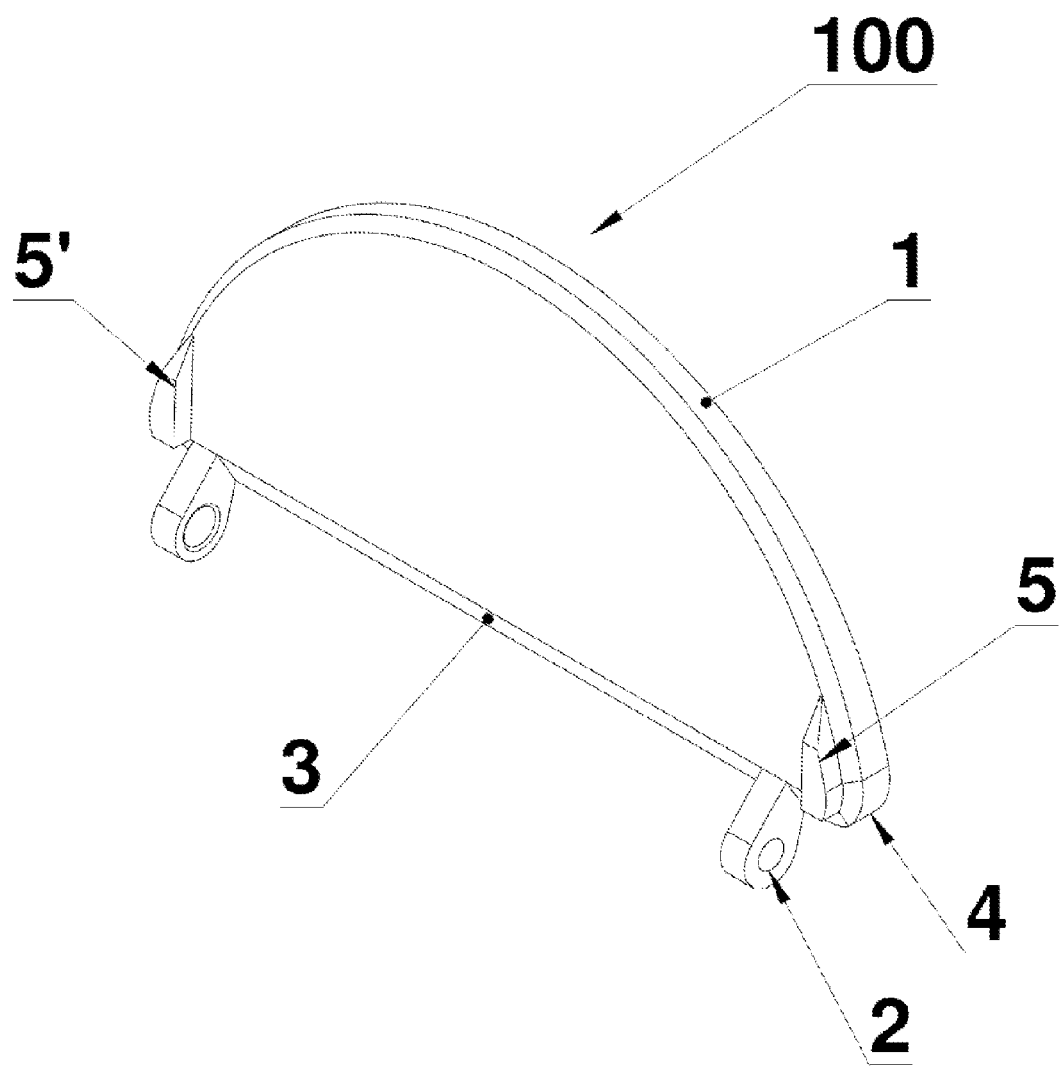
FIG. 1 shows an isometric view of a metal plate for a dual plate check valve according to a first embodiment of the present invention.

FIG. 1 illustrates a metal plate (100) for a dual plate check valve. The metal plate includes a plate member (1) which is a substantially circular segment shaped plate member or D shaped of a predetermined substantially uniform thickness. A means (2) is provided for pivotally mounting said plate member (1) to enable rotation about an axis substantially parallel and adjacent to chord (3) of said circular segment of the plate member. The plate member has a central portion and two extreme end portions (4) distal to said central portion. The end portions (4) are provided with reinforcements (5, 5'). The reinforcements (5, 5') increase the thickness of the plate member at the end portions (4) only. The reinforcements (5, 5') may be provided on both sides of the plate member or on one side opposite to the side of the plate member which is adapted to sit on a valve seat (not shown). The reinforcements (5, 5') may be so located that when the plate member of the check valve is in closed position, the end portions (4) with reinforcements are in radially outward direction from the valve seat of the check valve. When back pressure acts on said plate member, the reinforcements enable said plate member to distort substantially uniformly to maintain sealing contact with the valve seat. The plate member is a cast, forged or rolled metal plate.

The reinforcements (5, 5') of the plate member (1) may include one or more ribs or any other shape in each extreme end portion (4) of said plate member.

The reinforcement (5, 5') of the plate member may be of such height so as to work as stopper in cooperation with a stopper pin.

The means (2) for pivotally mounting said plate member may be at least one hinge eye fixed proximal to the chord of the circular segment shaped plate member. Hereinafter, "means (2)" will be interchangeably referred as "hinge eye (2)". The at least one hinge eye (2) is adaptable to receive a hinge pin (8). The hinge pin (8) is rotatably fitted in the hinge eye (2). In an embodiment of the present invention, the plate member may have two hinge eyes (2) fixed proximal to the chord (3) of the circular segment shaped plate member. The two hinge eyes (2) may be located proximal to extreme end portions (4).

Figure 2:
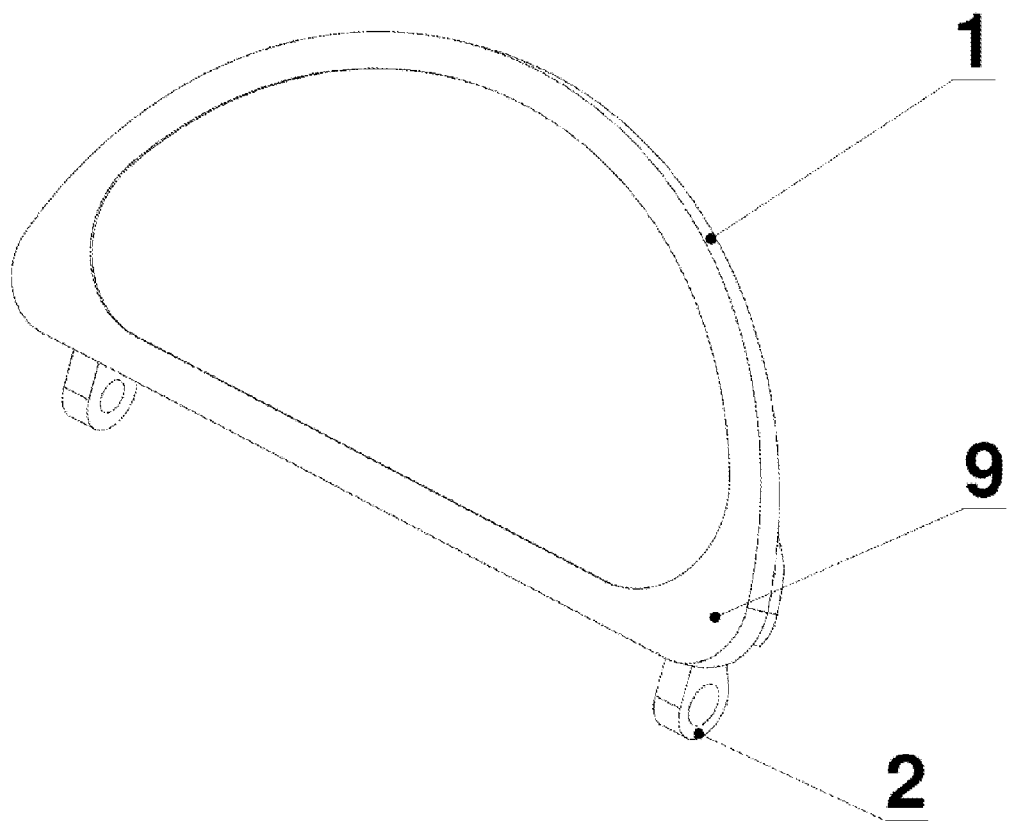
FIG. 2 shows another view of the metal plate of FIG. 1.

FIG. 2 illustrates another view of the plate member (1). Specifically, the figure illustrates the rear side of the plate member (1) that is opposite to the side having reinforcements. The said rear side is adapted to sit on the valve seat. As shown in FIG. 2, the rear side of the plate member has a peripheral edge portion (9) along the boundary of the plate member. The peripheral edge portion (9) is machined such that it is adapted to rest onto the valve seat of the dual plate check valve for enabling a leak proof sealing contact therewith.

Figure 3:
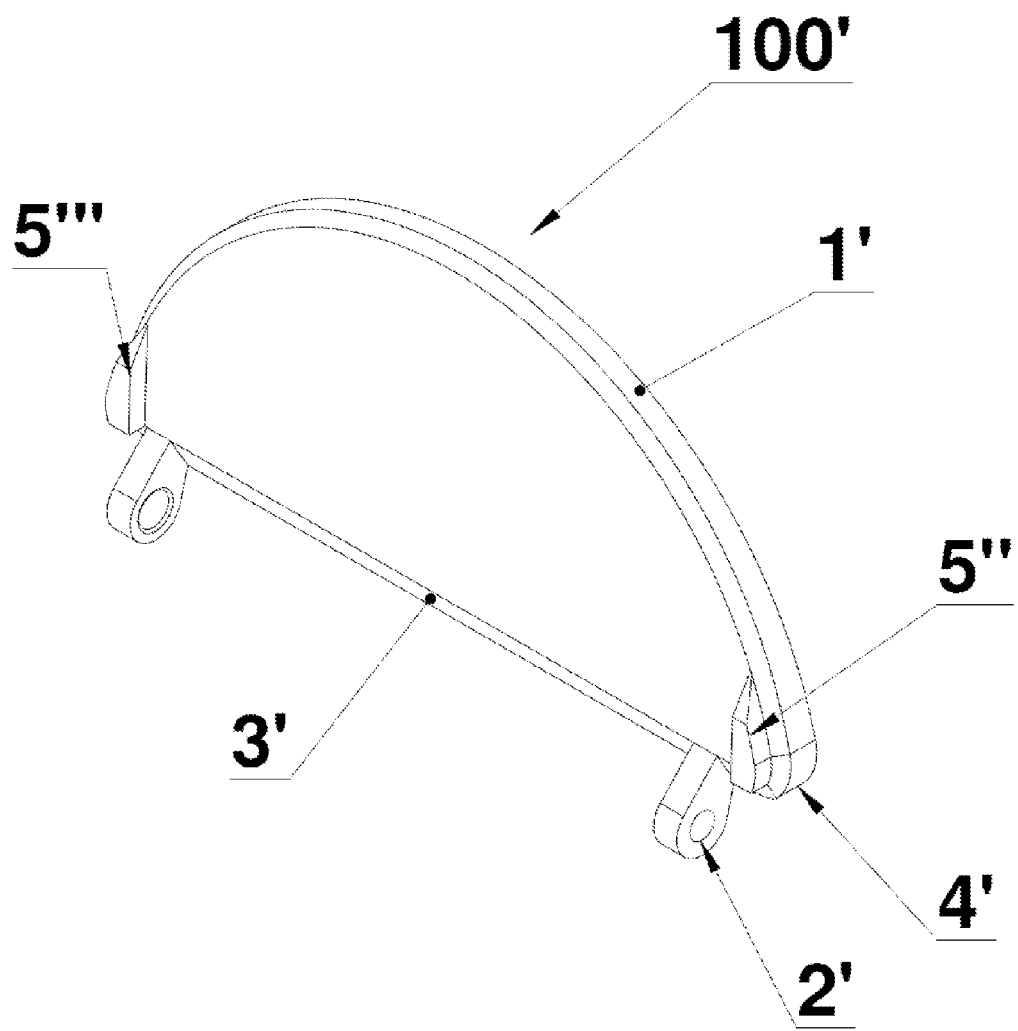
FIG. 3 shows an isometric view of a metal plate for a dual plate check valve according to a second embodiment of the present invention.

FIG. 3 illustrates another embodiment of the metal plate of a dual plate check valve. A metal plate (100') is shown which includes a plate member (1'). The plate member (1') has a central portion and two extreme end portions (4') separated by said central portion. The end portions (4') are provided with reinforcements (5", 5'"). The reinforcements (5", 5'") increase the thickness of the plate member (1') at the end portions (4'). The reinforcements (5", 5'") may be provided on both sides of the plate member or on one side opposite to the side of the plate member which is adapted to sit on a valve seat (not shown). The metal plate (100') also includes a means (2') for pivotally mounting said plate member (1') to enable rotation about an axis substantially parallel and adjacent to chord (3') of said circular segment of the plate member (1'). In an embodiment of the present invention, the means (2') for pivotally mounting said plate member may be two hinge eyes fixed proximal to the extreme end portions (4') of the plate member (1'). Hereinafter, "means (2')" will be interchangeably referred as "hinge eyes (2')". The hinge eyes (2) are configured to receive a hinge pin (8) adapted to be rotatably fitted therein.

Figure 4:
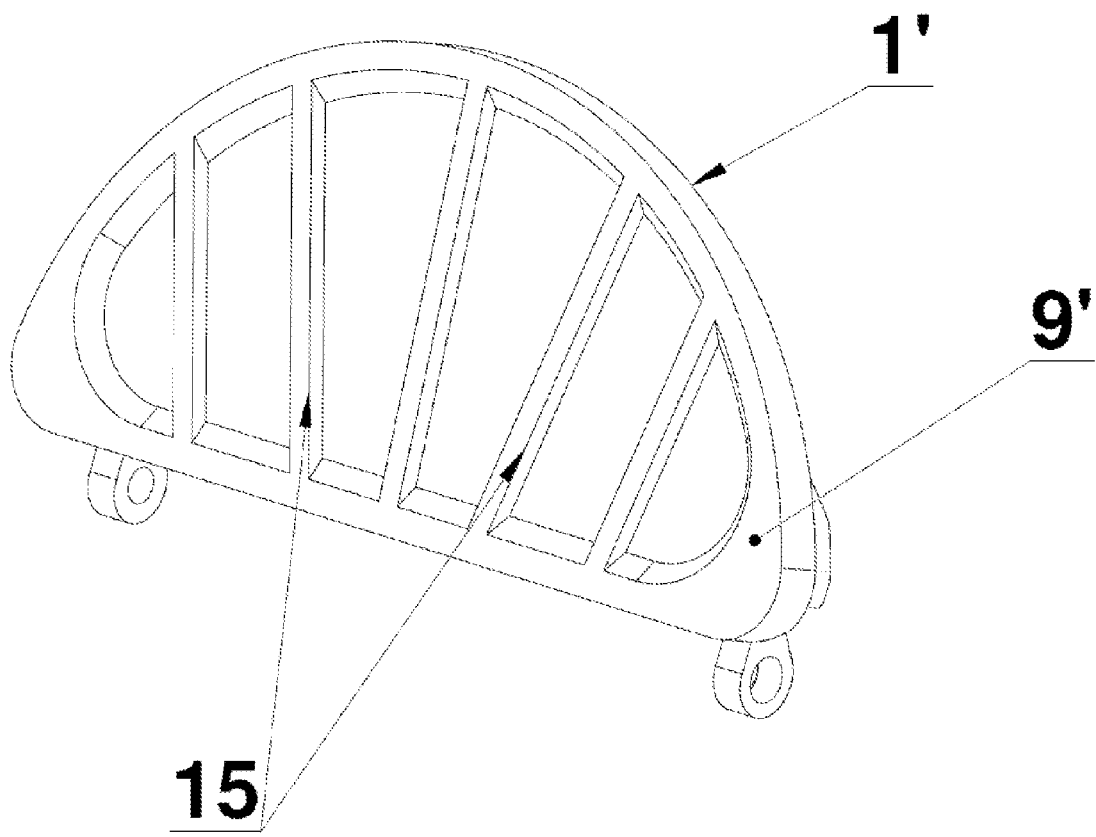
FIG. 4 shows another view of the metal plate of FIG. 2.

FIG. 4 illustrates another view of the plate member (1'). Specifically, the figure illustrates the rear side of the plate member (1') that is opposite to the side having reinforcements (5", 5'"). The said rear side is adapted to sit on the valve seat. As shown in FIG. 4, the rear side of the plate member (1') has a peripheral edge portion (9') along the boundary of the plate member (1'). The peripheral edge portion (9') is machined such that it is adapted to sit on the valve seat of the valve for enabling a leak proof sealing contact therewith. Further, a plurality of ribbed structures (15) are configured within a hollow portion enclosed by the peripheral edge portion (9'). The plurality of ribbed structures (15) provide rigidity to the plate member (1') and help in reducing weight thereof at the same time.

Figure 5:
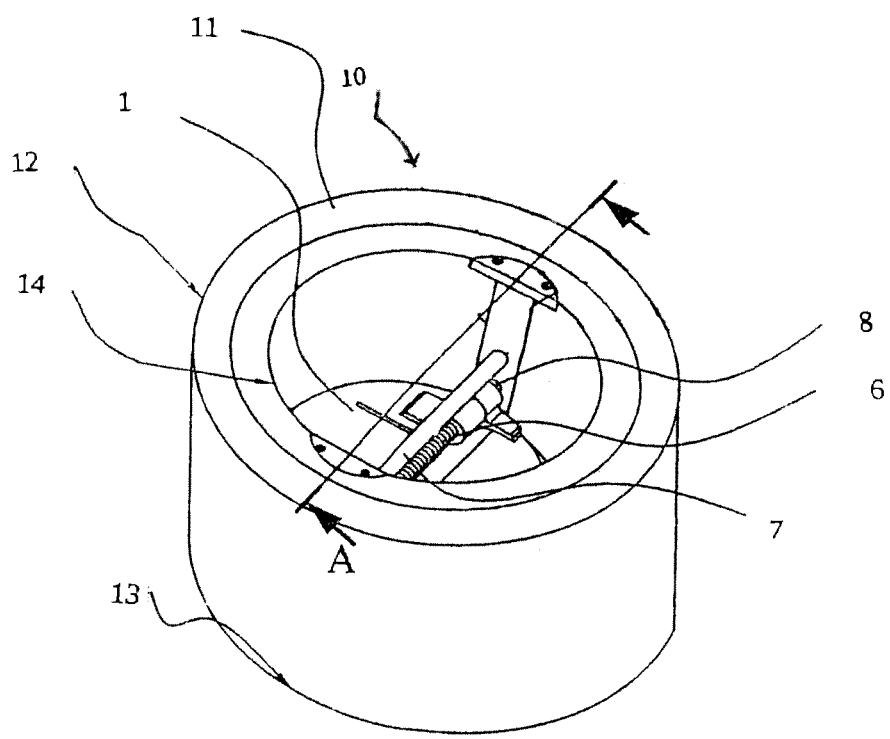
FIG. 5 shows a dual plate check valve according to an embodiment of the present invention.

FIG. 5 illustrates a dual plate check valve (10) according to an embodiment of the present invention. The dual plate check valve (10) utilizes the metal plate (100) described in conjunction with FIGS. 1 and 2. The dual plate check valve (10) comprises an annular valve body (11) having a downstream end (12), an upstream end (13), a through passage (14) with two substantially circular segment shaped openings, and two substantially circular segment shaped plate members (1) to effectively close said openings after sitting on the valve seat (not shown). Each plate member (1) is of predetermined substantially uniform thickness. The plate member (1) may be hinged on at least one hinge pin (8) and loaded with a spring (6) and a stop pin (7) to prevent the plate member from toppling over. The plate member (1) has a central portion and two extreme end portions (4) distal to said central portion. The end portions (4) may be provided with reinforcements (5, 5'). The reinforcements (5, 5') may be configured by increasing the thickness of the plate member (1) at the end portions (4). The reinforcements may be so located that when the plate member of the check valve is in closed position, the end portions (4) with reinforcements are in radially outward direction from the valve seat of the check valve. When back pressure acts on said plate member, said reinforcements (5, 5') enable said plate member to distort substantially uniformly to maintain sealing contact with the valve seat.

We claim:

1. A metal plate for a dual plate check valve comprising:
   a substantially semi-circular segment shaped plate member of a predetermined substantially uniform thickness, said plate member having a central portion and two extreme end portions distal to said central portion;
   a means for pivotally mounting said plate member to enable rotation about an axis substantially parallel and adjacent to a longest chord of said semi-circular segment of the plate member; and
   reinforcements configured on the end portions of the plate member such that the thickness of the plate member is increased at only the end portions, the reinforcements being in a radially outward direction from a valve seat of the check valve, the reinforcements located to enable the plate member to distort substantially uniformly to maintain sealing contact with the valve seat when back pressure acts on the plate member.

2. The metal plate for a dual plate check valve of claim 1, wherein said plate member is a cast, forged or rolled plate.

3. The metal plate for a dual plate check valve of claim 1, wherein said reinforcements are one or more ribs in each extreme end portion of said plate member.

4. The metal plate for a dual plate check valve of claim 1, wherein said reinforcements are located on both sides of the plate member.

5. The metal plate for a dual plate check valve of claim 4, wherein said reinforcements have a height so as to work as a stopper in cooperation with a stopper pin.

6. The metal plate for a dual plate check valve of claim 1, wherein said means for pivotally mounting said plate member is at least one hinge eye fixed proximal to the longest chord of the semi-circular segment shaped plate member, the at least one hinge eye configured to receive a hinge pin adapted to be rotatably fitted therein.

7. The metal plate for a dual plate check valve of claim 6, wherein the plate member has two hinge eyes fixed proximal to the longest chord of the semi-circular segment shaped plate member.

8. The metal plate for a dual plate check valve of claim 7, wherein each hinge eye is located proximal to an extreme end portion of the plate member so that, when back pressure acts on the plate member, the back pressure will be substantially evenly distributed to each hinge eye.

9. The metal plate for a dual plate check valve of claim 6, wherein said at least one hinge eye is proximal to one of the extreme end portions.

10. The metal plate for a dual plate check valve of claim 1, wherein said reinforcements are positioned directly on the plate member.

11. A dual plate check valve, comprising:
    an annular valve body having an upstream and a downstream end;
    a through passage with two substantially semi-circular segment shaped openings; and
    two substantially semi-circular segment shaped metal plate members to effectively close said openings, each said plate member being of predetermined substantially uniform thickness, said plate member being hinged on at least one hinge pin and loaded with a spring and a stop pin to prevent the plate member from toppling over, said plate member having a central portion and two extreme end portions distal to said central portion, wherein said end portions are provided with reinforcements, thereby increasing the thickness of the plate member in only the end portions, the reinforcements being in a radially outward direction from a valve seat of the check valve, the reinforcements located to enable the plate member to distort substantially uniformly to maintain sealing contact with the valve seat when back pressure acts on the plate member.

12. The valve of claim 11, wherein said reinforcements are positioned directly on one of the plate members.

13. The valve of claim 11, wherein each plate member includes two means for pivotally mounting said plate member, and each means for pivotally mounting said plate member is located proximal to an extreme end portion of the plate member so that, when back pressure acts on the plate member, the back pressure will be substantially evenly distributed to each means for pivotally mounting said plate member.

\* \* \* \* \*